July 7, 1959

H. F. PAUL 2,893,578

LOAD LEVELING CART

Filed March 1, 1957

Hal F. Paul INVENTOR.

BY *[signatures]* Attorneys

July 7, 1959 H. F. PAUL 2,893,578
LOAD LEVELING CART
Filed March 1, 1957 2 Sheets-Sheet 2
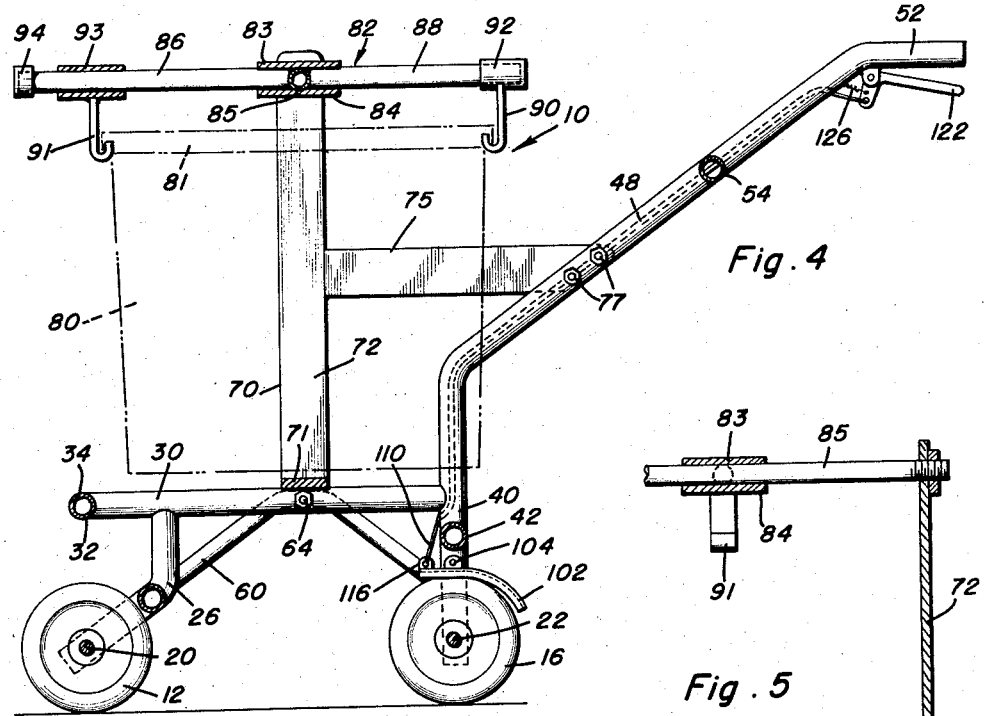
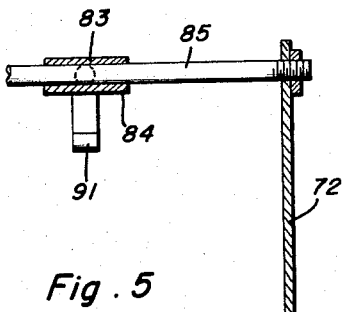
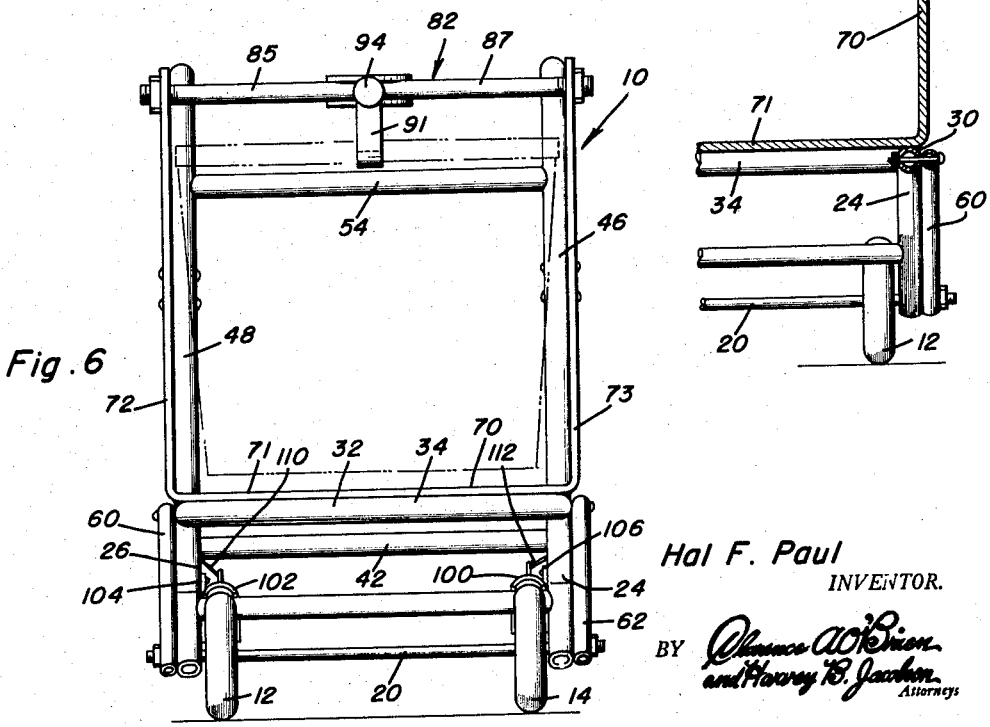
Hal F. Paul
INVENTOR.

United States Patent Office 2,893,578
Patented July 7, 1959

2,893,578

LOAD LEVELING CART

Hal F. Paul, San Francisco, Calif.

Application March 1, 1957, Serial No. 643,398

6 Claims. (Cl. 214—378)

This invention relates to a cart to facilitate hauling and transporting tubs.

An object of the present invention is to provide a cart which maintains a tub level during the movement of the cart from one place to another, particularly when carrying tubs of meat from the butcher shop to the galley aboard ship.

A further object of the invention is to provide a tub transporting cart by which the tub is lifted and then transported, the tub remaining level even while the cart is lifted up and over comings or other irregularities in the deck, whereby the meats and juices in the tubs do not splash or spill from the tubs.

Another object of the invention is to provide a cart to transport tubs, holding the tubs elevated from a supporting surface so that they do not scrape along the bottoms thereof. Butcher shop tubs generally hold approximately 300 lbs. of meat, meat juices, etc. When tubs, so loaded are slid along the deck, the bottoms of the tubs wear out after several months of use. By my cart, it is believed that the life of the bottom of the tub will be extended indefinitely.

A further object of the invention is to provide a cart which will be a time-saver in the handling of tubs that are used aboard ship for containing meats and other foods and also which will make it much easier for the men to handle the heavy loads, usually about 300 lbs., represented by the loaded tubs. This is achieved by a chassis of durable but lightweight construction, the chassis having front and rear wheels together with an easily used handle, and a cradle which supports the tub for oscillation about a horizontal axis. Therefore, when the cart is lifted at the front end or rear end in order to raise over a high part of the deck, a coaming, or some other object, the cart remains practically perfectly level due to the pull gravity acting on the tub and swinging it always to remain upright even though the cart is tilted.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a sectional view taken approximately on the line 4—4 of Figure 3;

Figure 5 is a sectional view taken approximately on the line 5—5 of Figure 3;

Figure 6 is an elevational front view of the cart, and;

Figure 1:
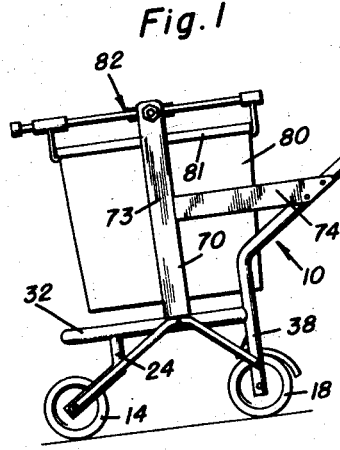
Figure 1 is an elevational side view of a cart which is constructed in accordance with the invention showing the same being used during the transportation of a tub.

In the accompanying drawings there is a cart 10 which is constructed in accordance with the invention. This cart is made of two front wheels 12 and 14 together with two back wheels 16 and 18 respectively. The front wheels are mounted for rotation on axle 20, while the back wheels are mounted for rotation on axle 22. Axle 20 is supported at the front end of the chassis of the cart, by a downwardly and forwardly angulated pair of arms 24 and 26 which are rigidly secured to the sides 28 and 30 respectively of the general U-shaped frame 32. The front part or cross member 34 of the frame joins the front ends of the sides 28 and 30. Axle 22 is carried by the vertical members 38 and 40, and these are held supported by means of the cross member 42 which extends therebetween and at a level slightly below the frame 32. The rear ends of the sides 28 and 30 are rigidly fixed to the vertical members 38 and 40. A pair of rearwardly extending handles 46 and 48 are fixed at the upper extremities of the vertical members 38 and 40 and may be formed integral therewith or joined thereto by standard fasteners. Horizontal hand grips 50 and 52 are at the rear extremities of the handles 46 and 48 and are located behind the transverse brace 54 which is fixed to the handles 46 and 48 to make a rigid, unified construction. Approximately U-shaped wheel braces 60 and 62 are secured intermediate their ends, as by bolts 64, to the sides 28 and 30 and are secured at their extremities to the angulated arms 24 and 26 and to the vertical members 38 and 40 respectively. This also tends to provide a rigid, strong and durable chassis.

Generally U-shaped cradle 70 has its bottom member 71 fixed to the sides 28 and 30 intermediate the front and rear ends thereof. The upstanding sides 72 and 73 of the generally U-shaped member 70 has rearwardly extending braces 74 and 75 protruding rearwardly from a point intermediate the upper and lower ends of sides 72 and 73 and are rigidly fixed, as by bolts 77 to the handles 46 and 48 between their junctions with the vertical members 38 and 40 and the transverse brace 54.

Figure 2:
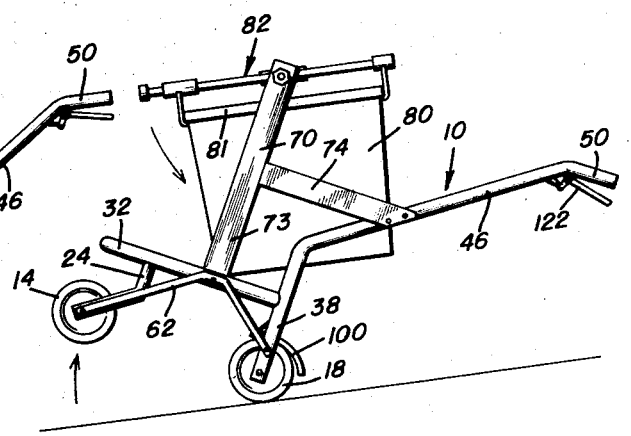
Figure 2 is an elevational side view of the cart of Figure 1 but showing the same being lifted over an object.
Figure 3:
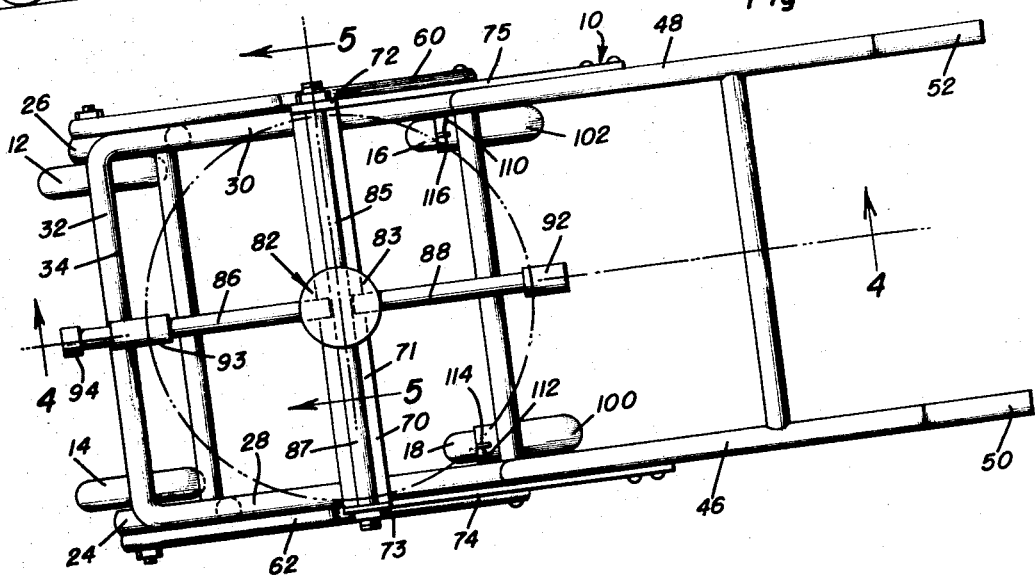
Figure 3 is an enlarged top plan view of the cart in Figure 1.
Figure 7:
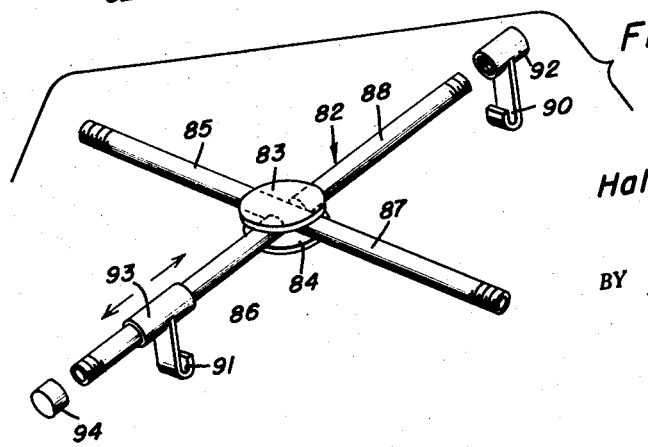
Figure 7 is an exploded perspective view of the sway bar and means to attach the tub to the cart.

Tub 80 is intended to represent a standard type tub used in galleys of ships in the handling of meats or other foods. Such tubs have a rib 81 at their upper edge. The sway bar support 82 (Figure 7) for the tub 80 is made of an upper and lower small plate 83 and 84 respectively, from which four arms 85, 86, 87 and 88 extend. Arms 85 and 87 are in alignment with each other and are passed through holes in the upper sides 72 and 73 of the cradle. Nuts are attached to the rear ends of the arms 85 and 87 thereby mounting the arms so that they are capable of being oscillated about an approximately horizontal axis. Arms 86 and 88 are in alignment with each other and are co-axial. Hooks 90 and 91 are on the arms 86 and 88. Hook 90 has one end fixed to collar 92, the latter being threaded on the extremity of arm 88. Hook 91 has one end rigidly fixed to a collar 93 which is slidably disposed on arm 86, this arm having a cap 94 at the extremity thereof. Accordingly, the hook 91 is adjustable with respect to the position and location of hook 90. Therefore, the tub 80 may be lifted to a position beneath the sway bar support 82 with the rim 81 engaged over hook 90. Then the hook 91 is capable of being slid under the opposite end of the rim 81 thereby supporting the tub so that it is capable of being oscillated as shown in Figure 2. Therefore, when the cart is moved from one position to another, over elevated places and other irregularities, the tub remains level.

There are brakes for the rear wheels 16 and 18 of the cart. The brakes consist of brake shoes 100 and 102 for the wheels 16 and 18, respectively, and each is pivoted to a corresponding vertical member 38 and 40. The ears 104 and 106 extend upwardly from the brake shoes 100 and 102 and pivot pins connect the ears to the vertical members 38 and 40.

Push-pull wires or cables 110 and 112 are attached to other ears 114 and 116 on the brake shoes or are attached in some other way to the brake shoes at a place laterally spaced from the pivots that mount the brake shoes on the vertical side members 38 and 40. These wires or cables extend through sheaths.

There are two brake operating levers 122 mounted pivotally on the hand grips 50 and 52 at the ends of handles 46 and 48. The wires 110 and 112, cables or the like, are attached to the levers 122 and are either passed on the outside or on the inside of the handles 46 and 48, to the brake shoes 100 and 102. Springs 126 attached to the levers and to the handles of the cart, urge the levers in such direction as to maintain the brake shoes separated from their wheels.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cart to transport a tub which has a laterally protruding rim at the upper end thereof, said cart comprising a chassis, a pair of front wheels and a pair of rear wheels, means supporting said wheels on said chassis, a generally U-shaped upwardly opening cradle attached to said chassis, handles protruding rearwardly from said chassis, means bracing said U-shaped cradle by being attached to said cradle and said handles, a sway bar support for the tub, said support having arms mounted for oscillation in said cradle and above said chassis and about a transverse axis, a second pair of arms, and means on said second pair of arms beneath said transverse axis to engage the flange of the tub and hold it supported within said cradle but capable of oscillating with said support about said axis.

2. A cart to transport a tub which has a laterally protruding rim at the upper end thereof, said cart comprising a chassis, a pair of front wheels and a pair of rear wheels, means supporting said wheels on said chassis, a generally U-shaped upwardly opening cradle attached to said chassis, handles protruding rearwardly from said chassis, means bracing said U-shaped cradle by being attached to said cradle and said handles, a sway bar support for the tub, said support having arms mounted for oscillation in said cradle and above said chassis, and at a position located in a plane between said front and rear wheels, a second pair of arms, means on said second pair of arms beneath the axis of oscillation of said arms to engage the flange of the tub and hold it supported within said cradle but capable of oscillating with said support, said adjustable means comprising a hook attached to said second arm, an additional hook, and means slidably mounting said additional hook on said second arm so that it is capable of being moved closer and farther from the first mentioned hook.

3. In a cart to transport, lift and lower tubs, the combination of a chassis, front wheels, means supporting said front wheels on said chassis, rear wheels, means supporting said rear wheels on said chassis, a pair of handles having hand-grips at the extremities thereof, a cradle attached to said chassis within which the tub is adapted to be located, means bracing said cradle to said handles to rigidify the handles and cradles with respect to said chassis, an oscillating sway bar support attached to said cradle, and hooks carried by said support in a vertical plane between said pairs of wheels and below the axis of oscillation of said support to engage the tub to hold the tub on the cart so that it is capable of oscillating with said support to shift the weight of the tub over the rear and front wheels successively as the cart has its front and rear wheels raised and lowered over obstacles, said support including a plurality of arms attached rigidly to each other intermediate the ends thereof.

4. The combination of claim 3 wherein said means supporting said front wheels on said chassis includes a pair of forwardly angulated arms, and braces attached to said angulated arms to help support said angulated arms.

5. The cart of claim 4 wherein the means to support the rear wheels include a pair of upright members to which the last mentioned braces are also attached.

6. The combination of claim 5 wherein said chassis includes a generally U-shaped member having sides to which the intermediate parts of said last mentioned braces are attached, and the ends of the sides of said generally U-shaped member being secured to said vertical members.

References Cited in the file of this patent

UNITED STATES PATENTS

| 391,554 | Parker | Oct. 23, 1888 |
| 2,377,845 | Westfall | June 5, 1945 |
| 2,500,055 | Baker | Mar. 7, 1950 |
| 2,747,755 | Kughler | May 29, 1956 |

FOREIGN PATENTS

| 568,264 | Germany | Jan. 17, 1933 |
| 1,024,094 | France | Jan. 7, 1953 |
| 1,075,786 | France | Apr. 14, 1954 |